US011690016B2

(12) United States Patent
Zanft (10) Patent No.: US 11,690,016 B2
(45) Date of Patent: Jun. 27, 2023

(54) CONTROL OF POWER TO RADIO EQUIPMENT USING GRAVITY ENHANCED LEVEL

(71) Applicant: CommScope Design & Integration UK Limited, Fife (GB)

(72) Inventor: Steven Zanft, York (GB)

(73) Assignee: CommScope Design & Integration UK Limited, Fife (GB)

( * ) Notice: Subject to any disclaimer, the term of this patent is extended or adjusted under 35 U.S.C. 154(b) by 111 days.

(21) Appl. No.: 17/458,722

(22) Filed: Aug. 27, 2021

(65) Prior Publication Data

US 2021/0392586 A1 Dec. 16, 2021

Related U.S. Application Data

(63) Continuation of application No. 16/760,172, filed as application No. PCT/US2018/057630 on Oct. 26, 2018, now Pat. No. 11,109,320.

(Continued)

(51) Int. Cl.
*H04W 52/02* (2009.01)
*H01Q 1/24* (2006.01)
(Continued)

(52) U.S. Cl.
CPC ........ *H04W 52/0254* (2013.01); *H01Q 1/246* (2013.01); *H04Q 1/028* (2013.01); *H04Q 1/28* (2013.01)

(58) Field of Classification Search
CPC .. H04W 52/0254; H04W 16/24; H01Q 1/246; H04Q 1/028; H04Q 1/28
See application file for complete search history.

(56) References Cited

U.S. PATENT DOCUMENTS

| 2004/0178955 A1 | 9/2004 | Menache et al. |
| 2006/0250091 A1 | 11/2006 | Ishida |

(Continued)

FOREIGN PATENT DOCUMENTS

| CN | 206422779 U | * | 8/2017 |
| KR | 10-2004-0048538 | | 6/2004 |

OTHER PUBLICATIONS

"Extended European Search Report for European Application No. 18872552.7, dated May 27, 2021, 9 pages".

(Continued)

Primary Examiner — Keith Ferguson
(74) Attorney, Agent, or Firm — Myers Bigel, P.A.

(57) ABSTRACT

Provided herein are systems, methods, and devices for controlling power to radio equipment that services antennas mounted on a structure, and disabling power to the same when either technicians are present or when the structure has tilted. The systems may include a main board comprising a processor and an isolation board located at least partially within the structure. The isolation board may be configured to transmit to the processor a signal when an input is received via a switch and periodically transmit an indication of an acceleration of the structure due to gravity in a selected axis. The processor may be configured to disconnect power to a radio unit servicing the antenna based on an occurrence of either receiving the first signal or determining that a tilt angle of the structure has exceeded a predetermined threshold for a predetermined period.

20 Claims, 5 Drawing Sheets

Related U.S. Application Data (60) Provisional application No. 62/579,302, filed on Oct. 31, 2017.

(51) Int. Cl.
*H04Q 1/02* (2006.01)
*H04Q 1/28* (2006.01)

(56) References Cited

U.S. PATENT DOCUMENTS

| | | |
|---|---|---|
| 2007/0252528 A1 | 11/2007 | Vermuelen et al. |
| 2009/0017869 A1 | 1/2009 | Hermansson et al. |
| 2010/0193336 A1 | 8/2010 | Walton et al. |
| 2011/0199274 A1 | 8/2011 | Dalmazzo |
| 2015/0357708 A1 | 12/2015 | Au |
| 2016/0020504 A1 | 1/2016 | Michaelis et al. |
| 2017/0122546 A1 | 5/2017 | Abbott et al. |

OTHER PUBLICATIONS

"International Search Report for corresponding International Application No. PCT/US2018/057630, dated Feb. 7, 2019, 3 pgs.".
"Written Opinion corresponding International Application No. PCT/US2018/057630, dated Feb. 7, 2019, 8 pgs."

* cited by examiner

CONTROL OF POWER TO RADIO EQUIPMENT USING GRAVITY ENHANCED LEVEL

CROSS-REFERENCE TO RELATED APPLICATIONS

The present application is continuation of U.S. patent application Ser. No. 16/760,172, filed on Apr. 29, 2020, which is a 35 U.S.C. § 371 national stage application of PCT International Application No. PCT/US2018/057630, filed on Oct. 26, 2018, which claims priority to U.S. Provisional Application No. 62/579,302, filed on Oct. 31, 2017, and the entire contents of each above-identified application are incorporated by reference herein for all purposes.

FIELD

The present disclosure relates generally to providing power to equipment, and more specifically power to radio frequency (RF) equipment installed near a top of a structure.

BACKGROUND

Cellular communications systems are known in the art. In a typical cellular communications system, a geographic area is divided into a series of regions that are referred to as "cells," and each cell is served by a base station. Typically, a cell may serve users who are within a distance of, for example, 1-20 kilometers from the base station, although smaller cells are typically used in urban areas to increase capacity. The base station may include baseband equipment, radios and antennas that are configured to provide two-way radio frequency ("RF") communications with fixed and mobile subscribers ("users") that are positioned throughout the cell. In many cases, the cell may be divided into a plurality of "sectors," and separate antennas provide coverage to each of the sectors. The antennas are often mounted on a tower, pole, or other raised mounting structure, with the radiation beam ("antenna beam") that is generated by each antenna directed outwardly to cover the cell or a portion thereof.

There has been an increasing demand for wireless communication systems and a corresponding demand to provide greater coverage areas. Consumers now typically expect cell coverage and reception wherever they travel, including in urban, suburban, exurban, and rural locations.

SUMMARY

Some aspects of the present disclosure provide a system. The system may include a main board that includes a processor, and an isolation board that is located at least partially within a mounting structure. An antenna may be mounted to an upper portion of the mounting structure. The isolation board may be configured to: transmit to the processor a signal when an input is received via a switch. The isolation board may also be configured to periodically transmit an indication of an acceleration of the mounting structure due to gravity in a selected axis. The processor may be configured to disconnect power to a radio unit servicing the antenna based on an occurrence of at least one of a first condition and a second condition. The first condition may include receiving the signal from the isolation board, and the second condition may include determining that a tilt angle of the mounting structure has exceeded a predetermined threshold for a predetermined period. The tilt angle of the mounting structure may be determined based on the acceleration of the mounting structure due to gravity in the selected axis. Some aspects include corresponding computer systems, apparatuses, and computer programs recorded on one or more computer storage devices, for example those that control operation of the processor and/or the isolation board.

Some aspects of the present disclosure provide a method. The method may include: receiving, by a processor, a plurality of periodic signals from an accelerometer mounted at least partially within a mounting structure, where each periodic signal indicates a reading from the accelerometer of an acceleration due to gravity in a selected axis at a corresponding point in time; determining, by the processor and based on the plurality of periodic signals, that a change in the acceleration due to gravity in the selected axis exceeds a predetermined threshold and has lasted longer than a predetermined duration; and based on the determining, disconnecting power to a radio unit that services an antenna that is mounted to an upper portion of the mounting structure. Some aspects include computer systems, apparatus, and/or computer programs recorded on one or more computer storage devices, that are each configured to perform some or all of the operations of the methods provided herein.

Some aspects of the present disclosure provide a system that includes a mounting structure; an isolation switch that is mounted on the mounting structure and that includes a housing, an isolation board within the housing, and an accelerometer mounted to the isolation board; and a main board. The main board may include a processor and may be mounted at a location remote from the mounting structure. The main board may be coupled to the isolation board via a cable. The processor of the main board may be configured to disconnect power to a radio unit servicing an antenna mounted to an upper portion of the mounting structure based on determining that a command to disconnect the power has been received via the isolation switch or based on determining that data received from the accelerometer indicates that a tilt angle of the mounting structure has exceeded a predetermined threshold for a predetermined period of time. Corresponding computer systems, apparatuses, and computer programs recorded on one or more computer storage devices are disclosed herein.

DETAILED DESCRIPTION

To address the increasing demand for wireless communications, network operators have deployed increasing numbers of cellular antennas and base stations. In some areas, these deployments may take advantage of various factors present at the installation site to reduce visual clutter and increase power efficiency and usage. For example, in many rural or sparsely populated areas, it may be more efficient to locate base station equipment such that it predominately services areas including and immediately surrounding roadways or motorways that traverse these rural locations. This may be the result of a relatively low number of subscribers that reside or work in these rural locations and a relatively higher number of subscribers that use motorways to travel between more populated locations.

In many jurisdictions, motorways and roadways are provided with light fixtures mounted on poles or columns at spaced intervals. These light fixtures may illuminate the surface of the motorway at dusk, increasing driver safety. It has been previously recognized that, because these light fixtures are already receiving power, they may also serve as installation sites for wireless communication equipment.

Figure 1:
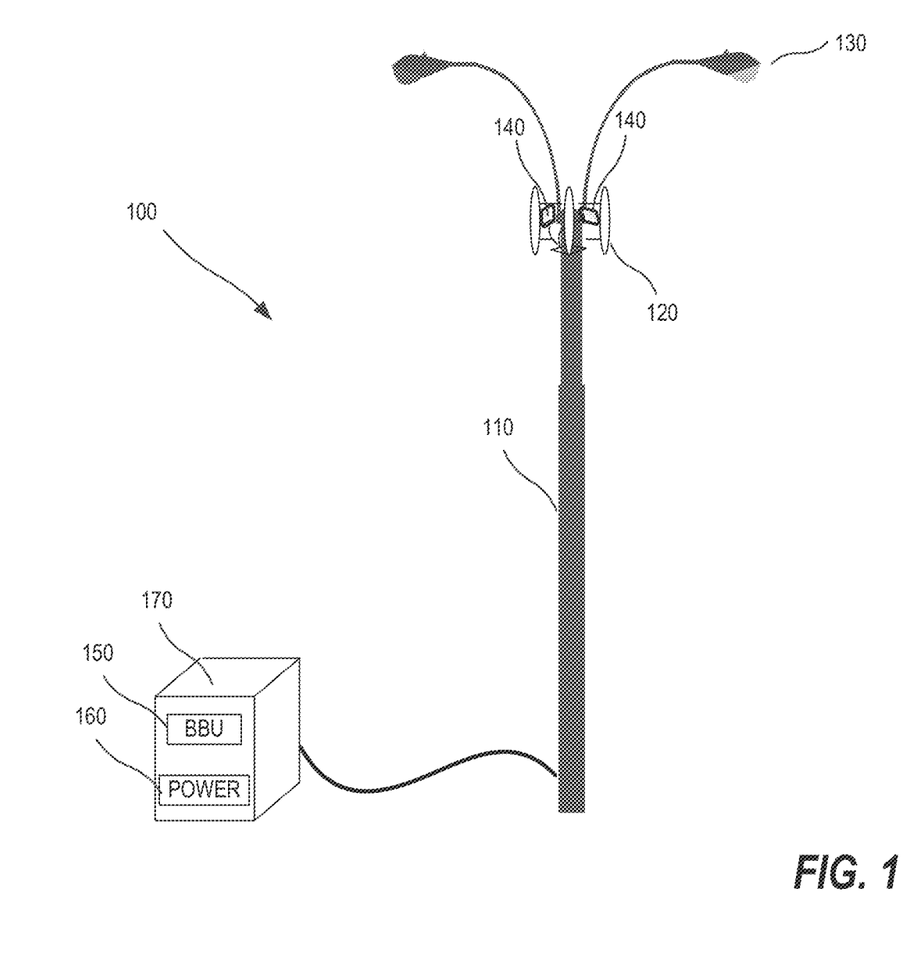
FIG. 1 is a schematic diagram of an example arrangement of a cellular base station at which aspects of the present disclosure may be used.

For example, FIG. 1 is a schematic diagram illustrating a cellular base station 100 that has antennas 120 colocated with light fixtures 130 mounted on an upper portion (e.g., the top) of a mounting structure 110. Cellular base station 100 may include a baseband unit 150 installed near the base of the mounting structure 110 (e.g., in a cabinet 170). The baseband unit 150 may be in wired communication with one or more radiohead units 140 that are coupled to the antennas 120. Although the radiohead units 140 are illustrated in FIG. 1 as remote radiohead units (RRUs) that are mounted proximate to the antennas 120 and the light fixutres 130, the present disclosure is not limited thereto. For example, the radiohead units 140 may instead be installed proximate to the baseband unit 150 near the base of the mounting structure 110 (e.g., in the cabinet 170). Mounting structure 110 may be a monopole, as illustrated in FIG. 1, but may instead be a guyed tower or self-supporting tower having a plurality of legs or other mounting structure. Mounting structure 110 may be referred to herein as a pole or column. In some aspects, the antennas 120 and the light fixtures 130 may be powered by a common cable that extends the vertical length of the mounting structure 110. Communication between the baseband unit 150 and the radiohead units 140 may also be provided, for example via optical and/or coaxial cables. Other equipment, such as power equipment 160 that provides power to one or more of the radiohead units 150 and the antennas 120, may be located in the cabinet 170.

Although such colocation of the antennas 120 and the light fixtures 130 provides benefits in terms of reduced visual clutter (e.g., because only a single pole or mounting structure may be needed to provide both illumination to an area local to the pole and wireless service to a greater area surrounding the pole), it has been recognized by the inventor that there are design considerations and constraints.

For example, local governments, electric companies, and/or other stakeholders may require a capability to temporarily depower and/or deactivate the antennas located at the top of the tower. This may be to provide safe working conditions for technicians tasked with replacing light bulbs in the light fixture. As with other forms of electromagnetic energy, power density from a cellular transceiver decreases as distance from the antenna increases. As a result, although an observed RF power density at ground level near the tower may be far below dangerous levels, the power density at the top of the mounting structure 110 may be high enough to result in potentially harmful exposure to a technician while the technician replaces the light bulbs. Providing a mechanism to temporarily deactivate the antennas significantly reduces the risk of exposure to the technician. However, it is desirable to minimize the amount of equipment that needs to be deactivated while the technician is present to reduce overall system downtime. For example, depowering the entire cellular base station may result in an extended delay even after the technician completes the light bulb replacement, as the BBU and other equipment will need to be repowered and brought back into servicing state.

Additionally and/or alternatively, it has been recognized that external forces may act upon the pole, resulting in the pole tilting from its normal upright position. As one example, a vehicular impact may occur, causing damage to the pole at its base, resulting in a tilt or even collapse of the pole. As another example, forces of nature (e.g., wind, earthquake, erosion, landslips, and the like) may act on the pole, resulting in the same tilt or collapse. In many of the situations, power to the equipment mounted on the pole may still be provided even upon tilt or collapse of the pole. This may result in RF emissions from the equipment that endanger bystanders, first responders, and passersby.

To address these issues, an isolation control circuit is provided herein that allows for disabling, deactivating, or de-powering of the radio equipment (e.g., radiohead units 140) when at least one of a first and second condition are present. In the first condition, a technician has arrived at the site to perform maintenance on equipment present at the site, for example the light fixtures 130. To perform this maintenance safely and without overexposure to RF radiation, the technician may de-power the radio equipment. As it is recognized that this technician may not be affiliated with an operator of the wireless communication network, the technician may de-power the radio equipment by control of a switch or rotary isolator (e.g., a rotary isolator switch 240 illustrated in FIG. 2) that is installed in a location that is accessible to the technician. This may be in an opening or cutout in the mounting structure itself, as the cabinet may be locked and non-accessible to the technician.

In the second condition, the mounting structure has tilted beyond a predetermined threshold for a predetermined period of time. This tilting may be because of either a collision and/or a natural event.

Figure 2:
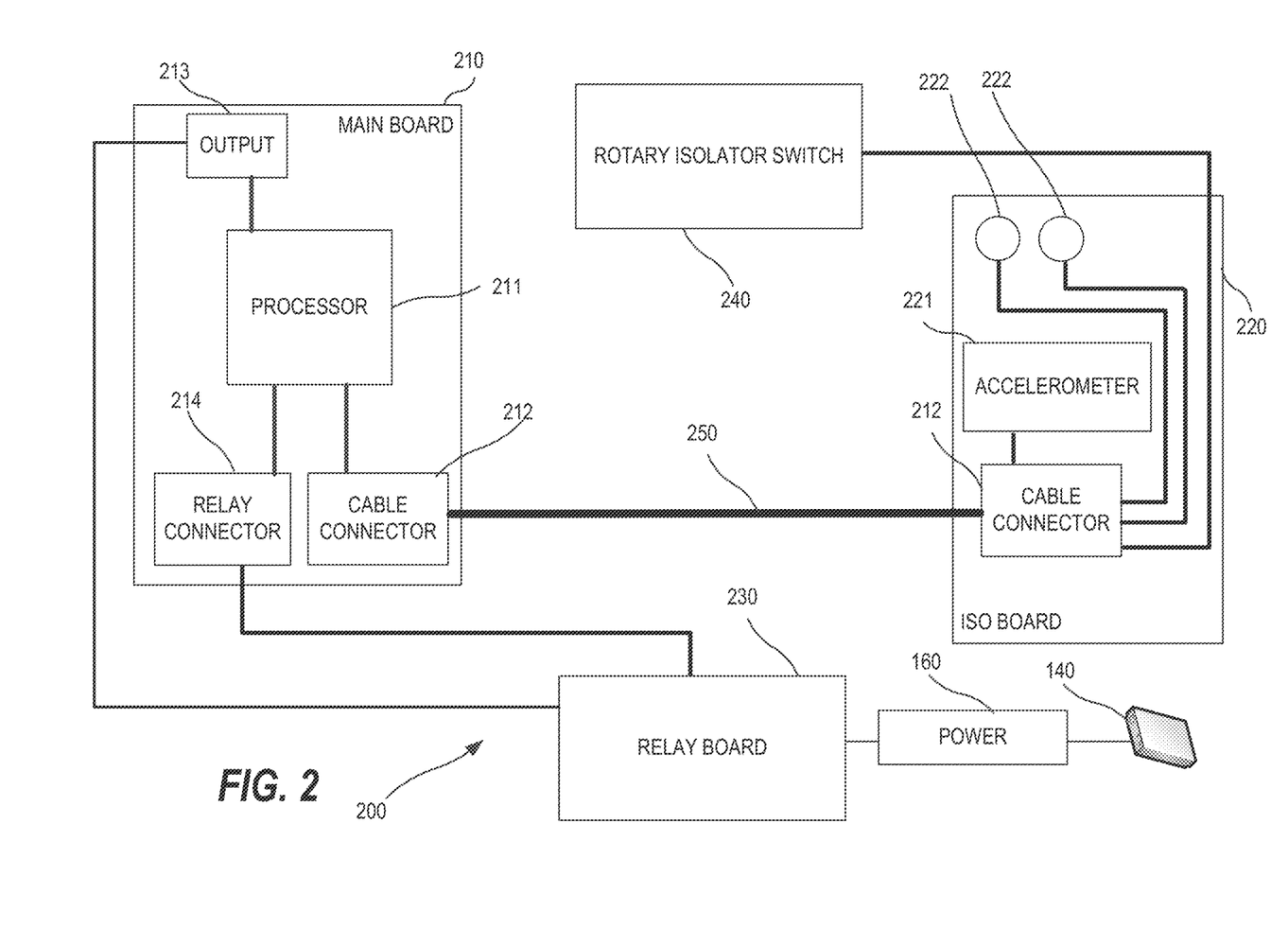
FIG. 2 illustrates an example isolation control circuit.

FIG. 2 illustrates a schematic drawing of an isolation control circuit 200 that operates to determine whether at least one of these conditions is present and disables power accordingly. Isolation control circuit 200 may include a main board 210, an isolation board 220, a relay module board 230. Each of these boards may be provided as, for example, a printed circuit board (PCB). The main board 210 and the isolation board 220 may be interconnected via a cable 250, which may be, for example, a RJ45 network cable. The selection of a standard cable such as the RJ45 network cable may provide cost savings and/or an ease of field installation. This connection between the main board 210 and the isolation board 220 may be via cable connectors 212 which provide standard connective pinouts from the cable for delivering signals elsewhere on the main board 210 and the isolation board 220. The main board 210 and the relay module board 230 may also be in communication via cabling, wires, or the like, via a relay connector 214 on the main board 210.

The main board 210 and the relay module board 230 may be installed at a location that provides a power source for radiohead units 140 (e.g., proximate to power equipment 160 in cabinet 170). The main board 210 may include a processor 211, an output portion 213, the relay connector 214, and the cable connector 212 discussed above. The processor 211 may include, for example, a microcontroller having a crystal oscillator. The processor 211 may be programmable and reprogrammable, including via onboard flash memory. In some aspects, the processor 211 may comprise an ARDUINO microcontroller board. The processor 211 may output (e.g., via pins of the processor 211) digital signals that are received at output portion 213 and transmitted from there to one or more relays installed on the relay module board 230. In some embodiments, a first relay and a second relay (neither shown in FIG. 2) may be provided on the relay module board 230. A first signal from the processor 211 may control the first relay and a second signal from the processor 211 may control the second relay. In some embodiments, the first and second relays may be enabled when a low (e.g., below 2.0 Volts) signal is present at their inputs and disabled when a high (e.g., above 2.0 Volts) signal is present at their inputs. The first relay may control enabling or disabling of power equipment 160 to provide power to the radiohead units 140. In some embodiments, enabling and disabling of the second relay may provide status information (via relay connector 214) to control light emitting diodes or other status indicators installed on the isolation board 220 (discussed below). In some embodiments, a first relay is installed on the relay module board 230, which controls both the power equipment 160 and the light emitting diodes, and therefore the second relay may be optional or omitted. In some embodiments, a first relay is installed on the relay module board 230, which controls the power equipment 160. The light emitting diodes may be driven by digital outputs from the processor itself.

The isolation board 220 may be installed at least partially within the mounting structure 110. In some embodiments, the isolation board is dimensioned such that it is located within a housing for the rotary isolator switch 240. However, as will be discussed further below with respect to FIG. 5, the rotary isolator switch 240 may be optional (in situations where only monitoring of the tilt of the mounting structure is required because there are no light fixtures 130 or other serviceable components), and accordingly in such embodiments the isolation board 220 may be instead provided in its own housing.

The isolation board 220 may include the cable connector 212 discussed above, and may also include an accelerometer 221 and first and second light emitting diodes (LEDs) 222. The accelerometer 221 may be a low-power, multi-axis accelerometer. In some embodiments, the accelerometer 221 may be a digital accelerometer. The first and second LEDs 222 may include a first LED configured to emit a first color (e.g., red) and a second LED configured to emit a second color (e.g., green). These LEDs 222 may indicate a status of the power provided to the radiohead units 140 to the technician. A first LED 222 may indicate that power is presently being provided to the radiohead units 140, and the second LED 222 may indicate that power is not presently being provided to the radiohead units 140.

Figure 3:
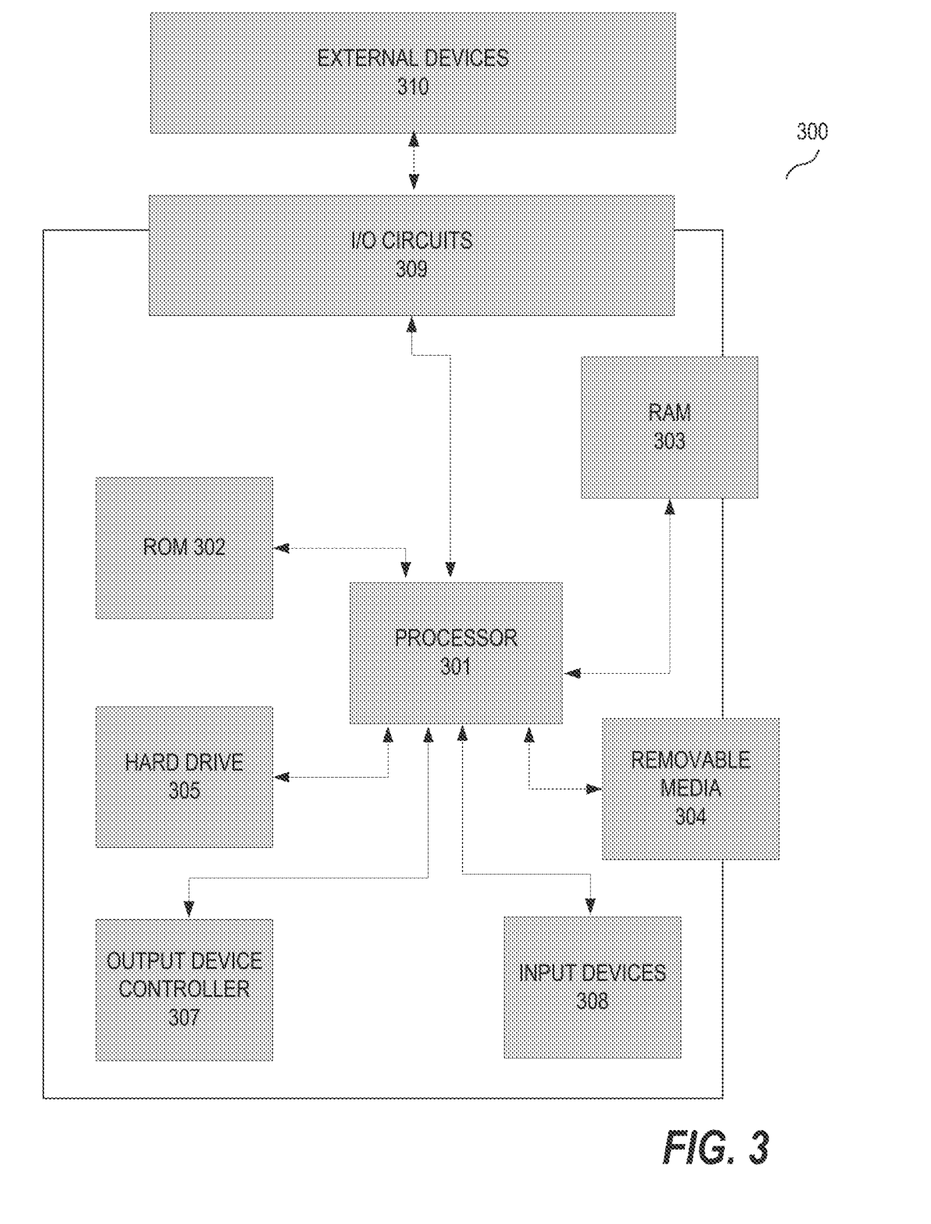
FIG. 3 is a block diagram of various components of computing devices, which may be used to implement components of the isolation control circuit.

FIG. 3 illustrates hardware elements that can be used in implementing any of the various computing devices and boards discussed above. In some aspects, general hardware elements may be used to implement the various devices discussed herein, and those general hardware elements may be specially programmed with instructions that execute the algorithms discussed herein. In special aspects, hardware of a special and non-general design may be employed (e.g., ASIC or the like). Various algorithms and components provided herein may be implemented in hardware, software, firmware, or a combination of the same.

A computing device 300 may include one or more processors 301, which may execute instructions of a computer program to perform any of the features described herein. The instructions may be stored in any type of computer-readable medium or memory, to configure the operation of the processor 301. For example, instructions may be stored in a read-only memory (ROM) 302, random access memory (RAM) 303, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. The computing device 300 may be configured to provide output to one or more output devices, and may include one or more output device controllers 307 to provide this output. Inputs, including user inputs, may be received via input devices 308, such as an accelerometer (e.g., accelerometer 221), a remote control, keyboard, mouse, touch screen, microphone, or the like. The computing device 300 may also include input/output circuits 309 which may include circuits and/or devices configured to enable the computing device 300 to communicate with external devices 310. The input/output circuits 309 may enable the computing device 300 to communicate with an external device 310.

As discussed above with respect to FIG. 2, the components of computing device 300 need not be located in a single housing (although they may be in some embodiments) and may be located in different locations. The components of a computing device 300 may engage in bidirectional or unidirectional communication via one or more wired or wireless interfaces (e.g., a wired bus, wireless protocol transceivers that are configured to communicate using Bluetooth, Wi-Fi, Zigbee, Z Wave, Sigfox®, LoRa®, RPMA, Weightless, NB-IoT, cellular Low Power Wide Access (LPWA), or other networks or communication protocols, and other wired or wireless interfaces).

Returning briefly to FIG. 2, the accelerometer 221 may be configured to provide output signals that indicate the acceleration due to gravity (e.g., 1 g or 9.8 m/s$^2$) in a chosen axis. In some embodiments, this may be a vertical or z-axis when the accelerometer 221 (and isolation board 220) are installed horizontally (e.g., parallel with the ground). However, it is recognized that, because the accelerometer 221 may, in some embodiments, provide multi-axis monitoring, one or more of the axes may be monitored to determine which axis or axes indicate acceleration due to gravity. This determined axis or axes may be used in addition to or in place of the z-axis for monitoring.

It has also been recognized that a tilt of the accelerometer 221, which if installed at least partially on or within the mounting structure 110 corresponds to a tilt of the mounting structure 110, results in a change of acceleration due to gravity in the monitored or selected axis. For example, the acceleration due to gravity in the monitored axis may be 9.8 m/s$^2$ when there is no tilt, but the acceleration due to gravity may be reduced when there is a tilt. It has been observed that an acceleration due to gravity in the monitored axis of 9.45 m/s$^2$ may correspond with a tilt angle of approximately 15 degrees from vertical. This may be due to force from gravity being applied along other axes (e.g., an x-axis, a y-axis).

If the acceleration due to gravity in the chosen axis drops below a predetermined threshold (which may be in some embodiments the example 9.45 m/s$^2$, which may correspond with a tilt angle of 15° from the vertical), for a predetermined number of processor cycles (which may be in some embodiments an example of 100), power to the radiohead units 140 may need to be deactivated, as the mounting structure 110 may be damaged or tilted. However, it is recognized that deactivating the unit unnecessarily may result in reduced efficiency or service within the wireless communication network. Therefore, if the accelerometer indicates a 'tilt' but later indicates no tilt (e.g., a value below the predetermined threshold) prior to reaching the predetermined number of processor cycles, the 'cycle counter' may be reset. This may have the effect of 'ignoring' any false readings, which as discussed above may be caused by local interference such as wind or heavy traffic.

Figure 4:
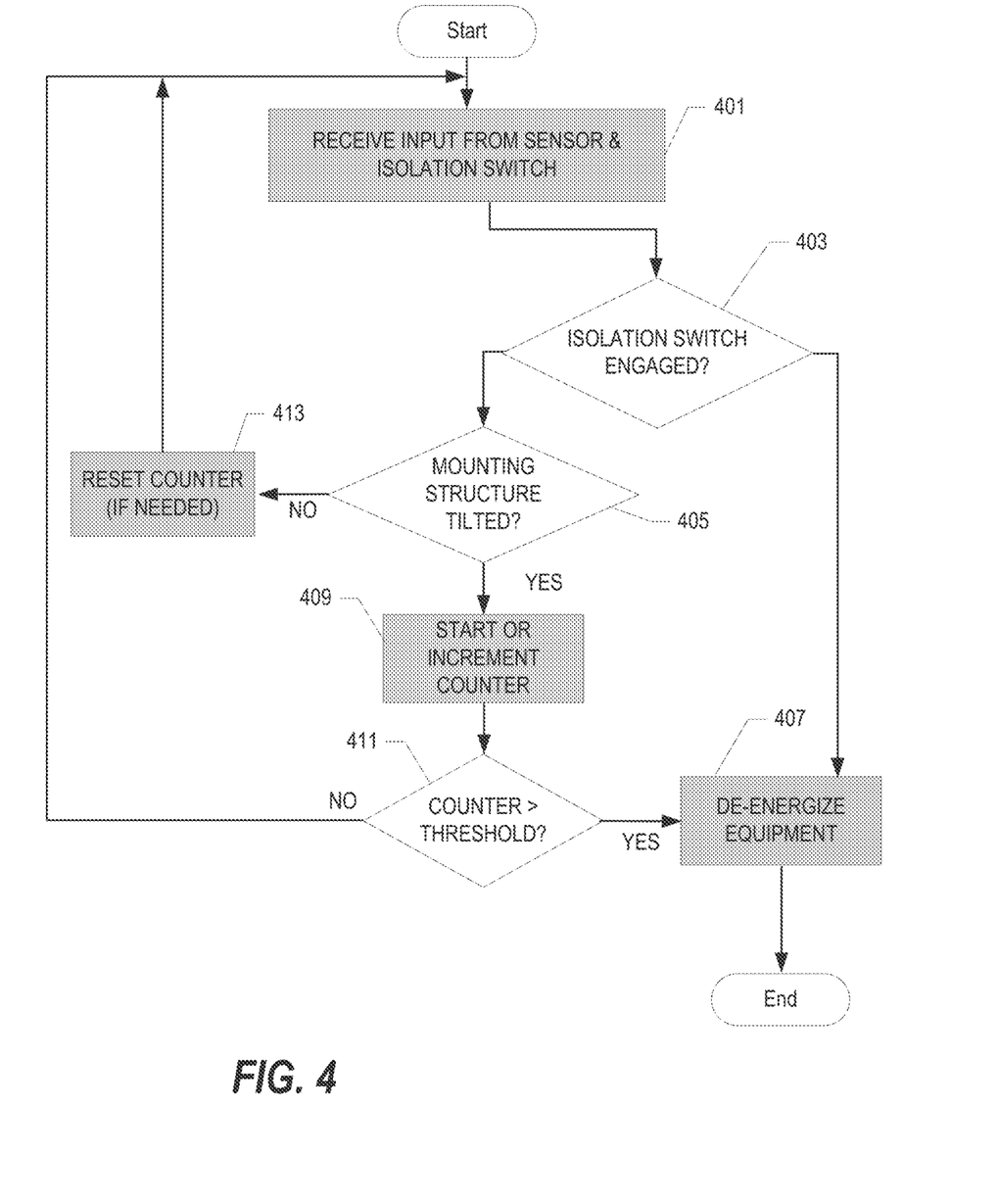
FIG. 4 is a flowchart diagram illustrating a process used by components of the isolation control circuit to determine whether to disable power to radio equipment.

In accordance with the above, FIG. 4 illustrates a process by which processor 211 may determine whether to deactivate the power to the radiohead units 140. The method illustrated in FIG. 4 may commence at operation 401, in which the processor 211 may receive data from accelerometer 221 and/or from rotary isolation switch 240. This operation may include, in some embodiments, converting and/or manipulating the data received from the accelerometer 221 into a different form. For example, in some embodiments, the accelerometer 221 may provide an acceleration, which may be converted into a tilt angle. In operation 403, it is determined whether the rotary isolation switch 240 has been engaged. If the rotary isolation switch 240 has been engaged (YES branch from operation 403), then the radiohead unit 140 and/or other equipment may be de-energized at operation 407 (e.g., by tripping a relay on relay module board 230). "Engaged" as used herein includes action by a technician to manipulate the switch 240 to either close or open a connection, depending on the wiring of the switch 240, that results in an indication to de-energize the radiohead unit 140.

If however, the rotary isolation switch 240 is not engaged (NO branch from operation 403) then it is determined whether the mounting structure is tilted at operation 405. As discussed above, this may include determining that acceleration due to gravity in a monitored or chosen axis has dropped below a predetermined threshold. As discussed above, this may be in some embodiments a drop below 9.45 m/s$^2$, which may correspond with a tilt angle of 15° from the vertical. In some embodiments, for example where the data received from the accelerometer 221 has been converted and/or manipulated, the predetermined threshold may be in units of degrees of tilt instead of in units of acceleration, or in any other appropriate units.

If it is determined that the mounting structure 110 is tilted (YES branch from operation 405), a counter may be started, or if previously started, incremented (operation 409). As discussed above, deactivating the radiohead unit 140 unnecessarily may result in reduced efficiency or service within the wireless communication network. To reduce the number of unnecessary deactivations, it is to be determined that a predetermined number of processor cycles or other threshold (measured in any acceptable units, such as time) has elapsed prior to deactivation of the equipment by the processor 211. Thus, at operation 411, if the counter is below the predetermined threshold, the processor 211 may await further data by looping back to operation 401. If, however, the counter is above the threshold (YES branch from operation 411), then the radiohead unit 140 is deactivated by stepping to operation 407.

Returning to operation 405, if it is determined that the mounting structure 110 is not tilted (NO branch from operation 405), then the processor 211 resets any running counter (if needed) and awaits further data by looping to operation 401.

Although not illustrated in FIG. 4, power may be restored to the radiohead units 140 by further manipulation of the rotary isolation switch 240, for example upon completion of the maintenance task for which the technician is present. However, if the mounting structure 110 has tilted for the predetermined period of time, in some aspects power may be disabled even if further data from the accelerometer 221 indicates that there is no longer a tilt, as there may be damage to the mounting structure 110 requiring substantive maintenance. Power to the radiohead units 140 may therefore be disabled until it is reset by a technician affiliated with the wireless communication service.

Figure 5:
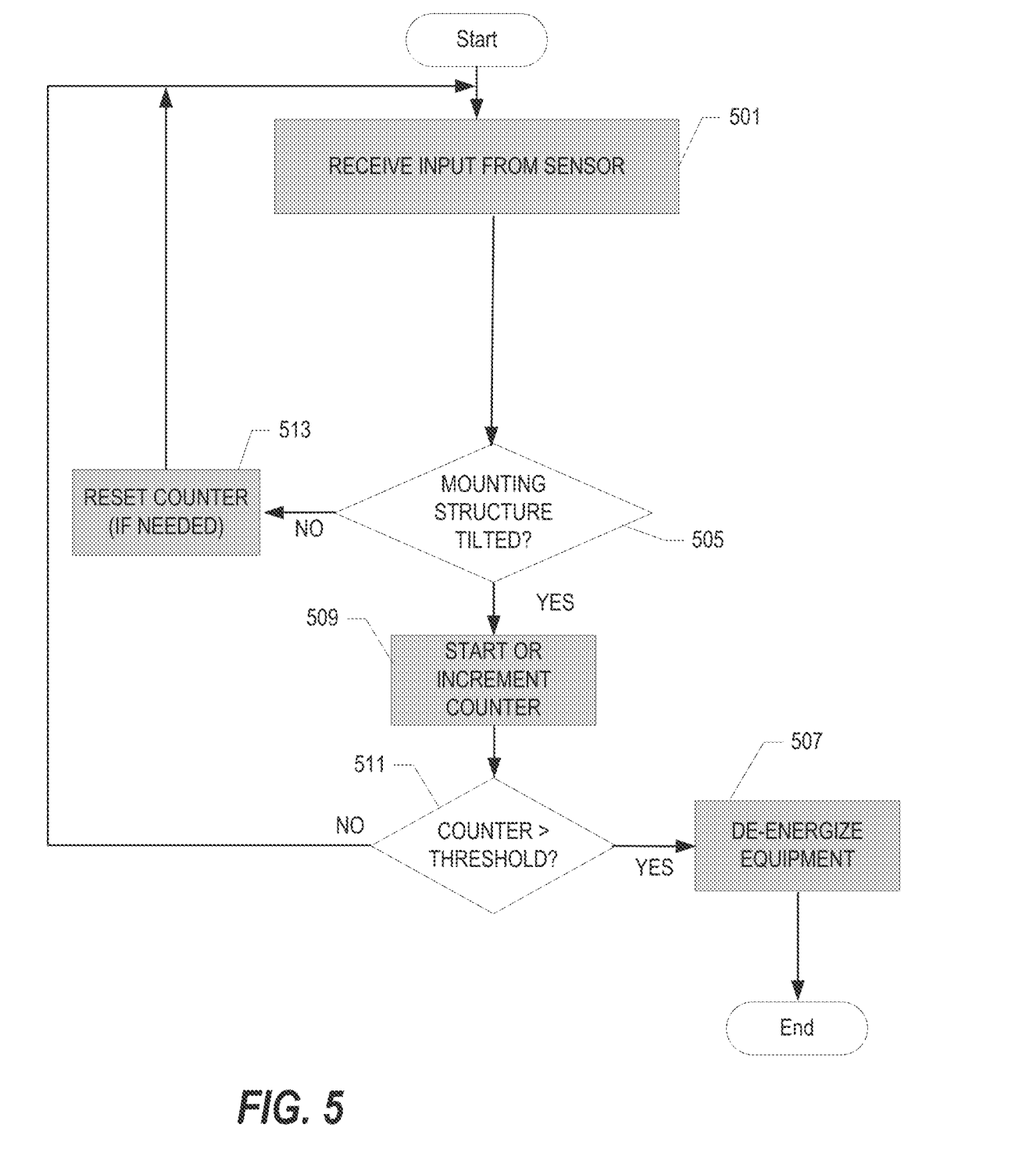
FIG. 5 is a flowchart diagram illustrating a second process used by components of the isolation control circuit to determine whether to disable power to radio equipment.

As discussed above, it is recognized that not every pole or mounting structure 110 may have both light fixtures 130 and antennas 120 mounted thereon. For example, some mounting structures 110 may have only antennas 120, and temporary deactivation by technicians for purposes of maintenance may be unnecessary. However, such mounting structures 110 may still be subject to external forces that may require deactivation of radio equipment when the mounting structure is tilted or broken. Accordingly, it is recognized that the rotary isolation switch 240 is optional, and may be omitted. FIG. 5 provides a process by which the processor 211 may still monitor a tilt angle of the mounting structure and de-activate the radiohead units 140 when the tilt angle exceeds a predetermined threshold for a predetermined period. Operations 501, 505, 507, 509, 511, and 513 are similar to operations 401, 405, 407, 409, 411, and 413 discussed above, and explanation of the operations of FIG. 5 are omitted herein for brevity.

The present disclosure provides several differences and advantages over systems known in the art. For example, previous 'tilt switch' mechanisms used mechanical devices to provide tilt sensing. These mechanical devices are susceptible to wear and damage over time. The present system in contrast uses an accelerometer which is less susceptible to wear and damage. Additionally and alternatively, using reprogrammable software and hardware instead of mechanical devices may enable field modifications of values to be used for the tilt threshold and/or the duration/cycle counter. This may allow for increased or decreased sensitivity to environmental factors present at some installation locations but not others (e.g., a site with more wind gusts versus a site with fewer wind gusts). Additionally and alternatively, field modifications of the one or more axes to monitor may enable installation of the accelerometer in a variety of configurations and/or directions that are selected on a site-by-site basis.

Previous systems that were based on mechanical devices were unable to provide a cycle counter, resulting in cyclical power 'chattering' where power would be turned on and off rapidly as the mechanical device toggled about its threshold value. The present disclosure, by providing a counter, avoids such chattering, extending the life and reliability of the electrical components of the cellular communication systems. Additionally and alternatively, previous systems only provided one status LED, which may result in confusion as to the status of the system when the system is in a failure mode. The present system provides additional feedback in the form of a second status LED, providing at least three statuses (e.g., first LED indicates that the RF components are active, second LED indicates that the RF components are deactivated, and no illumination of either LED indicates a fault in the isolation control circuit 200).

Aspects of the present disclosure have been described above with reference to the accompanying drawings, in which embodiments of the present disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A system comprising:
a radio unit configured to service an antenna mounted to an upper portion of a mounting structure;
an isolation board dimensioned for insertion within the mounting structure and comprising a switch and an accelerometer; and
a main board remote from the isolation board and comprising a processor configured to receive from the isolation board a first signal indicating an input has been received at the switch and a second signal indicating an acceleration of the mounting structure due to gravity in at least one selected axis,
wherein the processor is further configured to disconnect power to the radio unit based on an occurrence of at least one of a first condition and a second condition, wherein the first condition comprises receiving the first signal, and wherein the second condition comprises determining that a tilt angle of the mounting structure has exceeded a predetermined threshold for a predetermined period, wherein the tilt angle of the mounting structure is determined based on the acceleration of the mounting structure due to gravity in the at least one selected axis.

2. The system of claim 1, wherein the switch comprises an isolation switch.

3. The system of claim 1, wherein the predetermined threshold for the tilt angle is between 10-20 degrees from vertical.

4. The system of claim 3, wherein the predetermined threshold is field modifiable.

5. The system of claim 1, wherein the radio unit is mounted to the upper portion of the mounting structure.

6. The system of claim 1, wherein the isolation board comprises a first light emitting diode (LED) and a second LED, wherein illumination of the first LED indicates that the radio unit is powered, illumination of the second LED indicates that the radio unit is not powered, and illumination of none of the first and second LEDs indicates a fault status.

7. The system of claim 1, wherein the accelerometer is configured to provide multi-axis monitoring, and wherein the at least one selected axis comprises a plurality of axes.

8. The system of claim 1, further comprising a relay board electrically coupled between the main board and the radio unit.

9. A system comprising:
a mounting structure;
at least one radio unit mounted to the mounting structure;
at least one antenna mounted to the mounting structure;
an isolation switch mounted on the mounting structure, wherein the isolation switch comprises a housing and an isolation board within the housing, and wherein an accelerometer is mounted to the isolation board;
a main board comprising a processor and mounted at a location remote from the mounting structure and coupled to the isolation board via a cable; and
a relay coupled between the at least one radio unit and the main board,
wherein the processor of the main board is configured to de-energize the relay based on determining that a command to disconnect power has been received via the isolation switch and based on determining that data received from the accelerometer indicates that a tilt angle of the mounting structure in at least one axis has exceeded a predetermined threshold for a predetermined period of time.

10. The system of claim 9, wherein the predetermined threshold is between 10-20 degrees from vertical.

11. The system of claim 9, further comprising at least two status light emitting diodes mounted to the isolation board.

12. The system of claim 9, wherein the isolation switch is a rotary isolation switch.

13. The system of claim 9, wherein the processor is configured to determine whether the tilt angle has exceeded the predetermined threshold for the predetermined period of time by instantiating a cycle counter based on receiving first data indicating that the tilt angle exceeds the predetermined threshold, and wherein the processor is further configured to reset the cycle counter based on receiving second data indicating that the tilt angle does not exceed the predetermined threshold at some point prior to the instantiated cycle counter exceeding a cycle counter threshold.

14. The system of claim 9, wherein the relay is a first relay and the system comprises a second relay, each of the first relay and the second relay provided on a common relay module board.

15. The system of claim 14, wherein the processor is configured to control the first relay and the second relay via separate first and second signals.

16. The system of claim 15, wherein the processor is configured to control the second relay to indicate a status of the first relay.

17. The system of claim 16, wherein the status is indicated by at least one light emitting diode.

18. A system comprising:
- an isolation switch mountable to an antenna mounting structure, the isolation switch comprises a housing and an isolation board within the housing, the isolation board having an accelerometer mounted thereto;
- a main board mountable at a location remote from the antenna mounting structure and comprising a processor configured to communicate with the accelerometer and the isolation switch via a common cable; and
- wherein the processor of the main board is configured to de-energize radio equipment mounted to the antenna mounting structure based on determining that a command to disconnect power has been received via the isolation switch and based on determining that data received from the accelerometer indicates that a tilt angle of the antenna mounting structure in at least one axis has exceeded a predetermined threshold for a predetermined period of time.

19. The system of claim 18, wherein the predetermined threshold is between 10-20 degrees from vertical.

20. The system of claim 18, wherein the accelerometer is configured to provide multi-axis monitoring, and wherein the at least one axis comprises a plurality of axes.

\* \* \* \* \*